(12) United States Patent
Norton

(10) Patent No.: US 7,132,936 B1
(45) Date of Patent: Nov. 7, 2006

(54) ANGULAR RATE SENSOR

(76) Inventor: Peter Norton, P.O. Box 62, Northville, MI (US) 48167

( * ) Notice: Subject to any disclaimer, the term of this patent is extended or adjusted under 35 U.S.C. 154(b) by 0 days.

(21) Appl. No.: 10/189,650

(22) Filed: Jul. 3, 2002

Related U.S. Application Data

(63) Continuation-in-part of application No. 09/739,920, filed on Dec. 18, 2000, now abandoned, which is a continuation-in-part of application No. 09/294,520, filed on Apr. 20, 1999, now abandoned.

(51) Int. Cl.
*B60Q 1/00* (2006.01)

(52) U.S. Cl. ................. 340/440; 324/207.25; 340/967

(58) Field of Classification Search ................ 340/438, 340/440, 671, 672, 686.3, 967; 200/61.46; 180/272; 324/207.2, 207.25; 310/90.5; 244/3.15, 3.21; 702/127, 141; 335/219, 335/205–207
See application file for complete search history.

(56) References Cited

U.S. PATENT DOCUMENTS

| | | | | |
|---|---|---|---|---|
| 2,294,605 A * | 9/1942 | Newell | ..................... | 200/61.46 |
| 2,381,225 A * | 8/1945 | Newell | ..................... | 73/514.04 |
| 3,909,710 A * | 9/1975 | Newburgh et al. | ........ | 73/504.01 |
| 4,065,189 A * | 12/1977 | Sikorra | ...................... | 310/90.5 |
| 4,192,189 A * | 3/1980 | Presley | .................... | 73/504.03 |
| 4,444,444 A * | 4/1984 | Benedetti et al. | .......... | 310/90.5 |
| 4,507,737 A * | 3/1985 | LaSarge et al. | ............. | 340/967 |
| 4,972,332 A * | 11/1990 | Luebbering et al. | ........ | 702/145 |
| 5,025,663 A * | 6/1991 | Smith | ....................... | 73/514.02 |
| 5,067,084 A * | 11/1991 | Kau | ........................... | 701/220 |
| 5,132,665 A * | 7/1992 | Hutchisson et al. | ........ | 340/463 |
| 5,248,939 A * | 9/1993 | Brauer | ....................... | 324/174 |
| 5,371,460 A * | 12/1994 | Coffman et al. | ............ | 324/165 |
| 5,476,239 A * | 12/1995 | Brainard | ..................... | 244/171 |
| 5,523,679 A * | 6/1996 | Kalb | .......................... | 324/165 |
| 6,018,130 A * | 1/2000 | Haack et al. | ............ | 200/61.52 |
| 6,292,759 B1 * | 9/2001 | Schiffmann | ................. | 702/151 |
| 6,507,016 B1 * | 1/2003 | Cooper | .................... | 250/231.1 |

* cited by examiner

*Primary Examiner*—Thomas Mullen

(57) ABSTRACT

A sensor for measuring yaw rate or roll rate of an automotive vehicle comprises a freely rotating inertial disk and an angular rate sensor responsive to the rotation of the inertial disk relative to a housing. In one embodiment the inertial disk presents an alternating magnetic field at its circumference. The rate and direction of rotation of the inertial disk relative to its housing is determined by three magnetic field sensors such as linear Hall Effect sensors responsive to the field presented by the inertial disk. In another embodiment electronic cameras measure movement of fiducial marks on the inertial disk. Air surrounds the inertial disk and air viscosity gradually brings rotation to a stop. For yaw rate measurement the disk axis is oriented vertically and the inertial disk is supported in the radial direction by low friction bearings such as ball bearings or magnetic bearings and in the axial direction by substantially frictionless bearings such as magnetic bearings. In certain embodiments two magnetic poles operate as both axial and radial bearings. For the purpose of sensing incipient or actual vehicle rollover, the axis of the inertial disk is oriented in the direction of the roll axis of the vehicle. The angle of a recent rotation and rate of rotation of the inertial disk relative to the housing indicate the angle through which the vehicle has recently rotated about its roll axis and the roll rate of the vehicle.

36 Claims, 7 Drawing Sheets

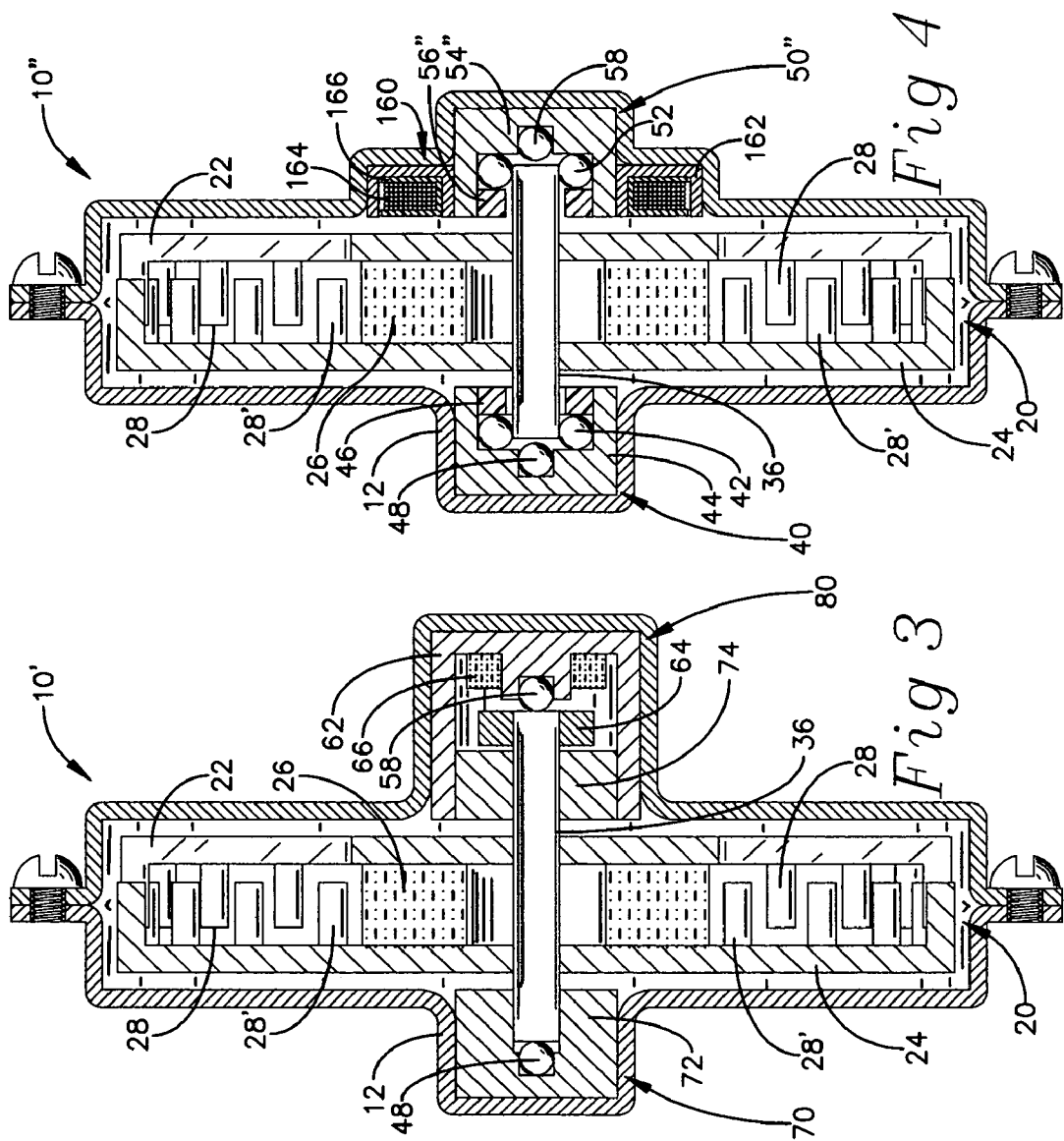

ANGULAR RATE SENSOR

This is a continuation-in-part of application Ser. No. 09/739,920 filed Dec. 18, 2000 and titled ANGULAR RATE SENSOR, now abandoned, which is a continuation in part of Ser. No. 09/294,520 filed Apr. 20, 1999 and titled ANGULAR RATE SENSOR, now abandoned.

FIELD OF THE INVENTION

This invention relates to means for measuring the yaw rate or roll rate and angle of an automotive vehicle for systems that protect the driver or assist the driver in controlling the vehicle.

BACKGROUND OF THE INVENTION

Certain automotive vehicles are presently equipped with yaw rate sensors fixed to the structure of the vehicle for sensing rotation of the vehicle about the yaw axis. The yaw rate is combined with other information to determine, for example, that the vehicle is sliding on the road. These systems sense when the vehicle is not pointing in the direction it is moving and assist the driver in restoring correct vehicle orientation by such means as selectively activating wheel brakes.

There are many ways that knowledge that a vehicle is about to roll over or has rolled over may be applied. Examples are that preventive action can be taken, fuel delivery can be stopped, electricity to any location where it might start a fire can be turned off and automatic attempts to summon help can be initiated.

Yaw rate sensing is presently accomplished by gyroscopic devices. These may comprise such as rapidly rotating wheels driven by an electric motor, rotating light beams, or vibrating elements such as the tines of a tuning fork. Yaw rate is determined from a vibrating element by measuring forces resulting from the Coriolis Effect which is the underlying basis for the Focault Pendulum.

Current production yaw rate sensors for automobiles are based on the Coriolis effect and are able to sense yaw rates under one degree per second. Measuring Coriolis forces is technically challenging. Currently available designs are considered expensive in spite of considerable efforts to reduce their cost.

It is well known to support a flywheel by magnetic force to achieve substantially zero friction as the flywheel rotates. Many designs exist for supporting rotating flywheels with approximately zero energy loss in the bearings.

Very low coefficients of friction are achieved by coatings comprising diamond like carbon. It has been reported that friction coefficients as low as 0.001 are achieved by these coatings in a dry nitrogen environment. This is similar to and possibly less than the rolling friction encountered by a steel ball bearing ball rolling on a smooth hard surface. Such very low bearing frictions and air viscosity operate to stop rotation of a wheel relative to its housing after a period of time.

Many known sensors can measure the rate and direction of rotation of a disk. Certain of these sensors apply little or no force to the disk as the rotation is sensed. This is commonly accomplished by optical sensors responsive to a pattern in the disk and by magnetic field sensors responsive to a magnetic field that rotates with the disk. Other sensors also measure rate and direction of rotation.

CMOS active pixel image sensors are integrated circuits similar to the integrated circuits used for many years for computer memories. CMOS image sensors are made in large numbers for sensing optical images in electronic digital cameras. CMOS image sensors comprise arrays of light sensing cells and may contain more than a million cells on a single piece of silicone. Sensors having tens of thousands of cells are available at low cost. CMOS active pixel image sensors have the advantage of including both light sensing cells and logic for processing the resulting digital images on a single piece of silicone. This enables a low cost sensor to record and analyze digital images and report the results of the analysis.

Low cost CMOS active pixel image sensors have the further advantage that the small number of cells can be read quickly which enables a sensor incorporating a CMOS active pixel image sensor to analyze images and report results at a high repetition rate such as one thousand readouts and analyses per second. The high rate enables unambiguous motion detection.

Motion sensors responsive to movement of features of a digital image are well known. An example is optical "mice" used for operator input to computers which are available from several suppliers.

A general object of this invention is to provide a yaw rate or roll rate sensor for a vehicle which also overcomes certain disadvantages of the prior art.

SUMMARY OF THE INVENTION

The invention follows from observing that a disk supported by low friction bearings remains almost stationary with respect to an inertial reference frame when a vehicle turns, causing it to rotate relative to the vehicle at a rate equal to the yaw rate of the vehicle. Therefore, a rotation rate sensor measuring the rate and direction of rotation of the disk relative to its housing provides a signal indicating the yaw rate of the vehicle. Further, this design costs much less to manufacture than sensors based on gyroscopic or Coriolis effects. Also, the yaw rate sensor of the invention, unlike gyroscopic or Coriolis effect sensors, is exclusively responsive to yaw rate whereas gyroscopes and vibrating tine devices respond both to yaw rate and rotation about a second axis which is either the pitch or roll axis. The resulting sensor output is ambiguous whereas the yaw rate sensor of the invention is not responsive to pitch rate or roll rate and its output, therefore, is not ambiguous. The combination of an inertial disk, a rate of rotation sensor and a sufficiently low friction bearing is, therefore, an improvement over the prior art technology by being lower in cost and responding to yaw but not to pitch or roll.

The yaw rate sensor of the invention provides an armature comprising an inertial disk mounted to rotate in the horizontal plane and supported by very low friction yet inexpensive bearings. A sensor responsive to the rate of rotation of the inertial disk relative to the vehicle provides the desired yaw rate signal.

Further, in accordance with a first embodiment of the invention, an inexpensive inertial disk and rate of rotation sensor comprises two mild steel stampings separated by a permanent magnet, the assembly having an axial shaft rotatable on very low friction bearings. The perimeters of the two stampings are formed into vertical fingers in the manner of the armature of an alternator to provide an alternating radial magnetic field at the periphery of the inertial disk. Three linear magnetic field sensors positioned near the periphery of the inertial disk each provide a signal indicating the radial component of the magnetic field. When the inertial disk is rotating, the three magnetic field sensors provide signals approximating sine waves that are 120 degrees out of phase with each other thereby providing information sufficient to determine the rate and direction of the rotation.

Further, in accordance with a second embodiment of the invention, an inexpensive inertial disk and rate of rotation sensor comprises a disk inscribed with a multiplicity of fiducial marks and mounted on an axial shaft that is rotatable on very low friction bearings. One or two digital cameras each observing the fiducial marks operate to measure the time taken by the image of a fiducial mark to move from one group of light sensing cells to a nearby group of light sensing cells. A linear relationship between movement of an image of a fiducial mark on the array of light sensing cells and the angle of rotation of the inertial disk determines an angle of rotation which is divided by the time for the rotation to occur to obtain the rate of rotation of the inertial disk. Each camera provides a signal indicating the rate of rotation of the inertial disk. Averaging the measurements of two or more cameras operates to cancel effects of cross axis movement, making the average insensitive to cross axis movement of the inertial disk while accurately measuring rotation.

Further, in accordance with the invention, each camera comprises a CMOS active pixel image sensor built on a single piece of silicon which includes both an array of light sensing cells and a computer and memory sufficient to read the array of light sensing cells and to determine and report the rate of rotation and, for some applications, the angular position of the inertial disk.

Further, in accordance with the invention, the bearings supporting the armature against vertical forces offer very low or zero friction by virtue of the vertical force provided by the bearing being largely or entirely magnetic force.

Further, in accordance with a first preferred bearing design of the invention, ball bearings prevent radial movement of the armature and a permanent magnet or electromagnet supports the armature in the axial direction. Ball bearings or other very low friction bearings have acceptable friction when resisting radial forces in a yaw rate sensor because the radial forces are small whereas ball thrust bearings do not have acceptable friction because the axial forces are much larger than the radial forces. Accordingly, it is provided for most or all of the thrust forces to be born by a magnetic thrust bearing.

Further, in accordance with a second preferred bearing design of the invention, ball bearings prevent radial movement of the armature and an electromagnet supports the armature in the axial direction. The axial position of the armature is sensed and the current in the electromagnet is controlled to maintain the armature at a predetermined axial position. In this design the only friction forces are those of the radial ball bearings.

Further, in accordance with a third preferred bearing design of the invention, bearings supporting the armature comprise elements coated with films of diamond like carbon operating in an atmosphere of dry nitrogen. In this embodiment both friction and wear of the diamond like coating may be reduced by providing magnetic force opposing the force of gravity.

Further, in accordance with a fourth preferred bearing design of the invention, the armature is supported between two magnetic poles whereby radial bearings are not required. Bearing sleeves spaced such a distance from the armature shaft that there is contact only during unusual conditions such as during a collision at which time the bearing sleeves prevent excessive excursion of the armature. The axial position of the armature is sensed and the current in the electromagnet is controlled to maintain the armature at a predetermined position between the magnetic poles. In this design the only significant friction results from the viscosity of the gas surrounding the armature.

Further, in accordance with a fifth preferred bearing design of the invention, the axial position of the armature is sensed by a light sensor responsive to light from a light source. The armature blocks a fraction of the light from the light source from reaching the light receiver. The fraction blocked by the armature depends on the axial position of the armature whereby the light receiver provides a signal indicating the axial position of the armature. The signal is used to control the axial position of the armature.

Further, in accordance with the invention, the yaw rate sensor of the invention responds solely to rotation about the yaw axis and not to rotation about the pitch or roll axes.

Further, in accordance with the invention, the axis of the angular rate sensor of the invention may be aligned with the forward-backward direction of the vehicle whereby the angular rate signal indicates the roll rate of the vehicle which may be integrated to provide the angle through which the vehicle has rolled.

A complete understanding of this invention may be obtained from the description that follows taken with the accompanying drawings.

DESCRIPTION OF THE DRAWINGS

FIG. 3 shows a side view of the angular rate sensor of the invention illustrated in FIG. 2 but with sleeve bearings instead of ball bearings.

FIG. 4 shows a side view of the angular rate sensor of the invention illustrated in FIG. 2 but with an electromagnet instead of a permanent magnet supporting the armature against axial forces.

FIG. 11 shows part of a set of unique fiducial marks.

FIG. 12 shows an array of 128×512 light sensing pixels.

BEST MODE FOR CARRYING OUT THE INVENTION

Figures 1, 2:
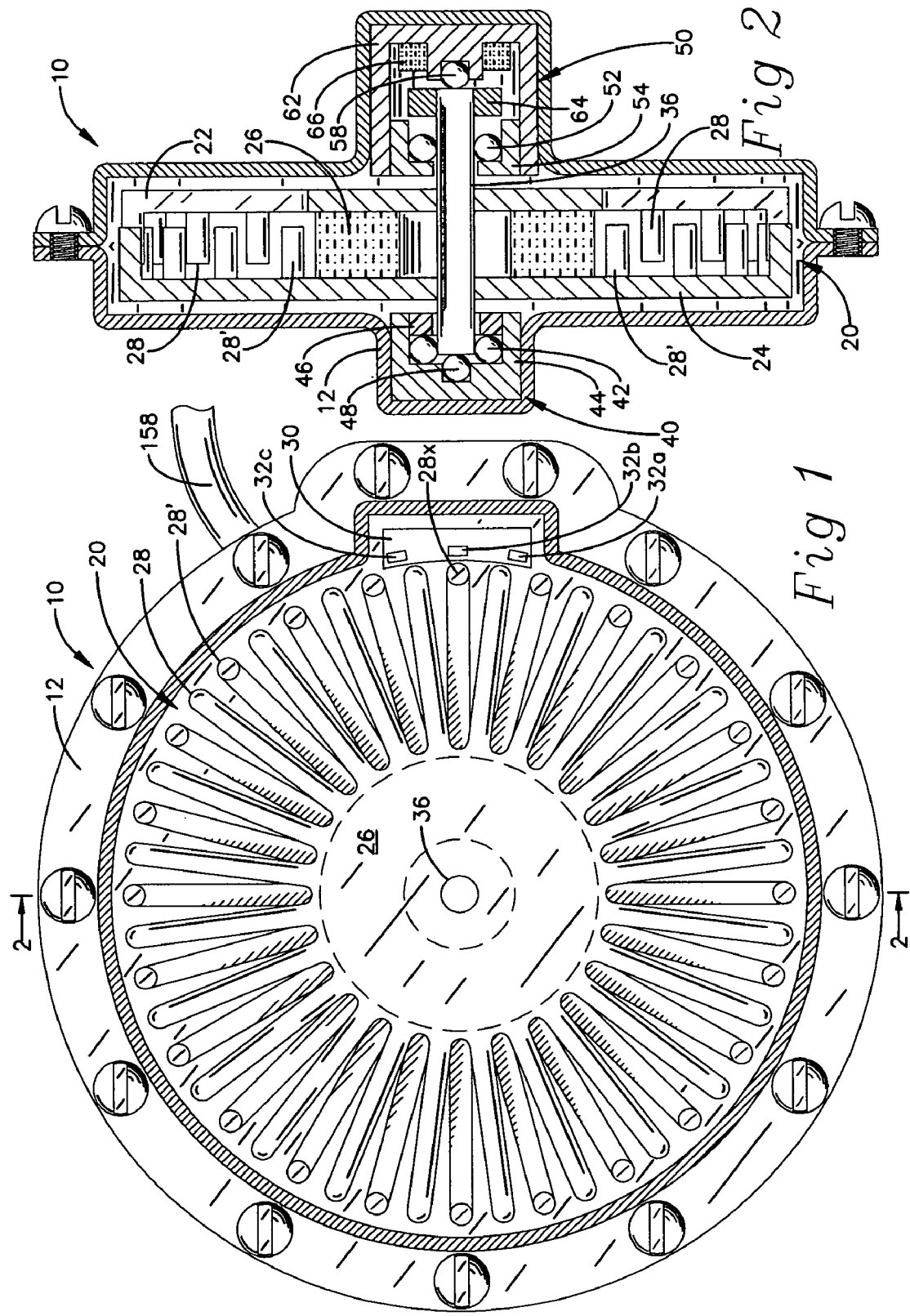
FIG. 1 shows a top view of the angular rate sensor of the invention with certain parts shown in section.
FIG. 2 shows a side view of the angular rate sensor of the invention taken at section 2—2 of FIG. 1 with certain parts shown in section.
Figure 8:
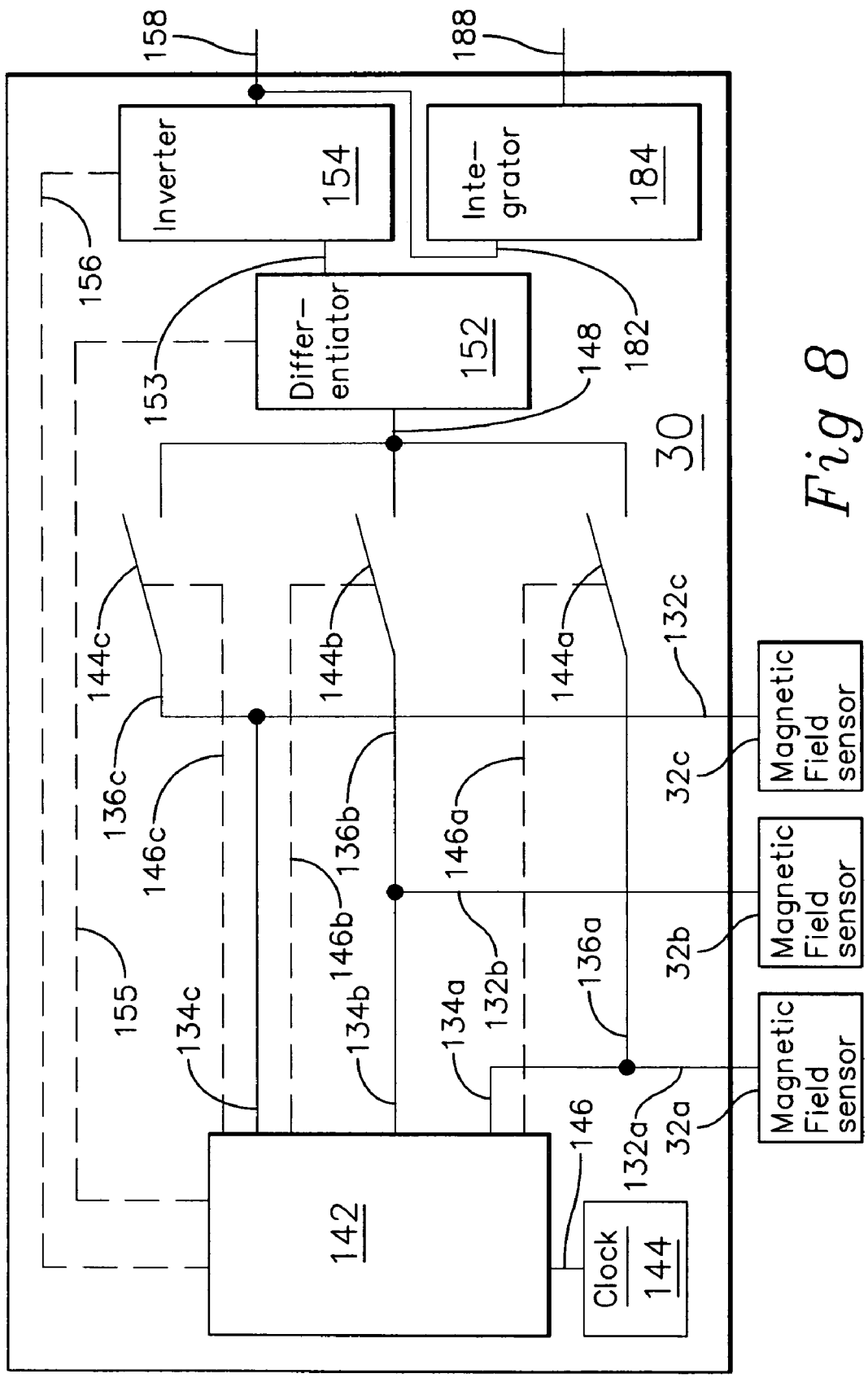
FIG. 8 shows schematically an electronic circuit for determining the rate of angular rotation of the inertial disk of the angular rate sensor of the invention illustrated in FIGS. 1 through 6.

Referring first to FIGS. 1 and 8, the angular rate sensor 10 comprises an inertial disk 20 rotatable on low friction bearings 40 and 50, and an electronic circuit 30 for producing an electric signal indicating the rate of rotation of inertial disk 20 relative to its outer housing 12. The rate of rotation signal indicates the yaw rate of the vehicle if the axis of the inertial disk is vertical. If the axis of the inertial disk is oriented along the forward-backward axis of the vehicle the rate of rotation signal indicates the angular roll rate of the vehicle which may be integrated to obtain a roll angle. It will be appreciated as the description proceeds that the invention may be implemented in different embodiments.

Proceeding now with particular reference to FIGS. 1 and 2, inertial disk 20 comprises an upper rotor 22 and a lower rotor 24 joined by a permanent magnet 26. Finger like pole pieces 28 and 28' at the periphery of inertial disk 20 present alternating radial magnetic fields to linear magnetic field sensors 32a, 32b and 32c. Inertial disk 20 includes axial shaft 36 mounted for radial support by lower ball bearing 40 and upper ball bearing 50. Permanent magnet 66 attracts ferromagnetic ring 64 to support inertial disk 20 against gravitational force. Lower stop 48 and upper stop 58 comprise bearing balls positioned to limit axial movement and provide low friction during rotation of inertial disk 20.

Figure 6:
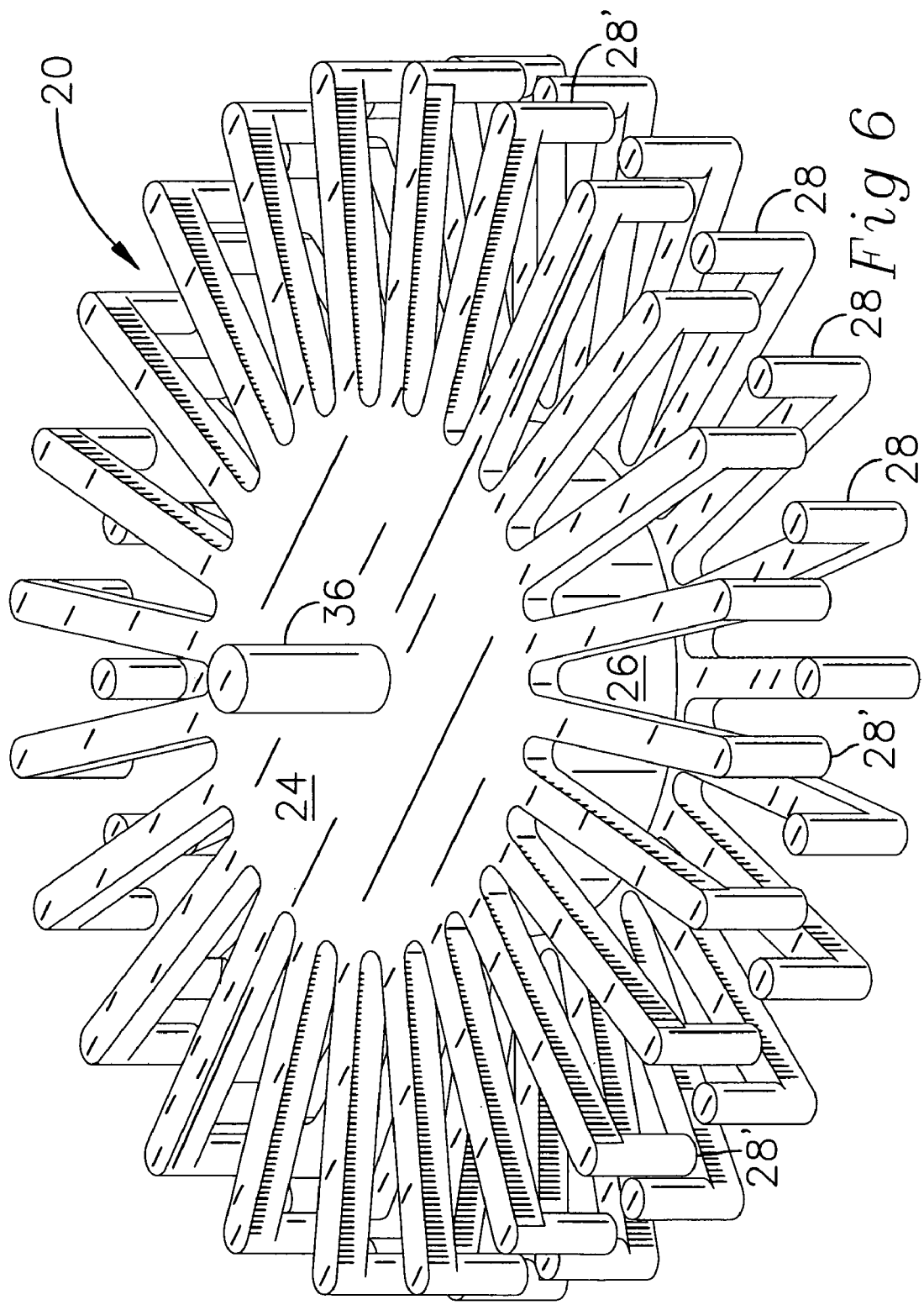
FIG. 6 shows an isometric view of the inertial disk of the angular rate sensor of the embodiments of the invention illustrated in FIGS. 1 through 5.

Upper rotor 22 is a disk of a ferromagnetic material such as low carbon steel with a plurality of finger like extensions extending radially from a central disk. A short distance from its end each finger like extension is bent 90 degrees to provide an axial pole element 28 for presenting a magnetic field at the periphery of inertial disk 20. Lower rotor 24 is the same as upper rotor 22 except it is inverted so its axial pole elements 28' extend in the direction opposite the direction the axial pole elements 28 of upper rotor 22 extend and lower rotor 24 is rotated so its vertical pole elements 28' are arrayed equidistant from the adjacent vertical pole elements 28 of upper rotor 22 resulting in alternating magnetic polarities equidistant from each other around the circumference of inertial disk 20. FIG. 6 illustrates an isometric view of inertial disk 20.

Magnet 26 is a permanent magnet magnetized in the direction of the axis of inertial disk 20. Many permanent magnet materials are suitable but ceramic permanent magnet materials presently offer the lowest cost with the possible disadvantage of substantial variation of the supplied magnetic field with temperature. One pole of permanent magnet 26 sends flux through upper rotor 22 and its fingers to cause all of the pole elements 28 at its periphery to have a predetermined magnetic polarity. The other pole of permanent magnet 26 provides flux through lower rotor 24 to cause all of the pole elements 28' at its periphery to have the opposite polarity. This causes the radial magnetic field presented by inertial disk 20 to reverse from one vertical pole piece to the next around the circumference of inertial disk 20.

Lower bearing 40 is a low friction bearing comprising lower ball bearings 42, bearing race 44, lower stop 48, and shaft 36. Ring 46 retains lower ball bearings 42 to keep them near the desired position. Upper bearing 50 is a low friction bearing comprising upper ball bearings 52, bearing race 54, upper stop 58, support 62, and shaft 36. The ball bearings 42 and 52, bearing races 44 and 54, and shaft 36 are preferably made of the hardest material for which the cost can be justified. Lower stop 48 and upper stop 58 are preferably ball bearings chosen for low friction against the flat ends of shaft 36. Silicon nitride ball bearings are commercially available but lower cost bearings are believed to provide adequate performance. A nonmagnetic material is preferred to prevent magnetic dust from sticking to the balls. A lower cost material for shaft 36, ball bearings 42 and 52 and stops 48 and 58 that is also nonmagnetic and presents a hard surface is a nonmagnetic stainless steel. Conventional ball bearings having inner and outer races may be substituted for the simple bearings illustrated, which have cylindrical surfaces rather than conventional inner and outer races, if they provide acceptable levels of frictional drag. Other ball bearings known by those skilled in the art of bearing design to be suitable may be substituted for bearings 40 and 50. If required, friction in the ball bearings can be further reduced by coating shaft 36, and balls 42 and 52 and stops 48 and 58 with diamond like carbon or other low friction coating.

Permanent magnet 66 is preferably made of a material that provides a magnetic field that is as independent of temperature as cost will allow. Alnico materials having superior retentivity and samarium cobalt are believe to be good materials for permanent magnet 66. Permanent magnet 66 is supported by support 62 which also provides a cavity for retaining stop 58. The force of permanent magnet 66 may be augmented by an electromagnet (not illustrated but refer to FIG. 5 for an illustration of an electromagnet assisting a permanent magnet) for finely adjusting the magnetic force on ferromagnetic ring 64. Ferromagnetic ring 64 is a ring of high permeability material such as low carbon steel.

Proceeding now with particular reference to FIGS. 1 and 8, electronic circuit 30 comprises linear magnetic field sensors 32a, 32b and 32c, control circuit 142, clock 144, switches 144a, 144b and 144c, differentiator 152 and controlled inverter 154. Electronic circuit 30 provides a signal at conductor 158 indicating the rate of rotation of inertial disk 20 with respect to housing 12. Magnetic field sensors 32a, 32b and 32c are preferably linear magnetic field sensors of the type that compensate for variation with temperature of the magnetic field provided by permanent magnet 26. Magnetic field sensors 32a, 32b and 32c are positioned to provide output signals approximating sine waves phased 120 degrees electrically from each other when inertial disk 20 rotates. Electronic circuit 30 may comprise integrator 184 for calculating the integral of the rate of rotation of inertial disk 20 with respect to housing 12.

Control circuit 142 receives clock signals through conductor 146 from clock 144 and receives the outputs of magnetic field sensors 32a, 32b and 32c through conductors 132a and 134a, 132b and 134b and 132c and 134c respectively. Control circuit 142 controls switches 144a, 144b and 144c to be open or closed as indicated by dashed lines 146a, 146b and 146c. The outputs of magnetic field sensors 32a, 32b and 32c are also provided to switches 144a, 144b and 144c respectively through conductors 132a and 136a, 132b and 136b and 132c and 136c respectively. At any given time the output of one and only one of the magnetic field sensors 32a, 32b and 32c is provided through one of the switches 144a, 144b or 144c respectively through conductor 148 to differentiator 152. Differentiator 152 is controlled as indicated by dashed line 155 by control circuit 142 to restart differentiation when a different switch 144a, 144b or 144c is closed so as to not differentiate the combined signal from one magnetic field sensor before switch closure change and from a different magnetic field sensor after switch closure change. Alternatively, differentiator 152 may be triplicated (not illustrated) and placed before switches 144a, 144b and 144c so that differentiation is always based on a smoothly changing signal. Control circuit 142 also controls inverter 154 as indicated by dashed line 156 to invert or not invert the signal received through conductor 153. Inverter 154 receives the differentiated signal from differentiator 152 through conductor 153 and follows the command from control circuit 142 to either pass it unchanged or change it to be of opposite sign but having the same magnitude as the signal it receives. The output of controlled inverter 154 is the desired angular rate signal which is communicated through conductor 158 to other parts (not illustrated) of the vehicle.

If integrator 184 is included for calculating an integrated angle, integrator 184 obtains the rate of rotation from conductor 158 through conductor 182 and places a signal indicating the integral on conductor 188.

The operation of the angular rate sensor 10 will now be described with reference to FIGS. 1, 2 and 8. When the vehicle is at rest or has been proceeding in one direction for a period of time inertial disk 20 is stationary and there is no relative rotation of inertial disk 20 with respect to housing 12 and there is no movement of the periphery of inertial disk 20 past magnetic field sensors 32a, 32b and 32c. Under these circumstances angular rate sensor 10 provides an output indicating zero angular rate through conductor 158.

When the vehicle changes its direction, there is a rate of angular rotation for a period of time. For example, and assuming there is no friction, when making a right turn the vehicle might rotate at the rate of fifteen degrees per second for six seconds to achieve a total rotation about the vertical axis of 90 degrees. For the six seconds while the vehicle is turning inertial disk 20 is not turning as viewed from inertial space but is turning at the rate of fifteen degrees per second relative to housing 12. Therefore, while the vehicle is turning, the output of angular rate sensor 10 indicates an angular rate of fifteen degrees per second. When the turn is complete the vehicle stops turning and inertial disk 20 and housing 12 again are both not rotating as seen from an inertial reference frame and, also, with respect to each other and the output of angular rate sensor 10 indicates an angular rate of zero.

Because the air in housing 12 is viscous and there is friction between shaft 36 and bearings 40 and 50 and stops 48 and 58, inertial disk 20 does not stay absolutely stationary without rotating as seen from inertial space. In the preceding example, bearing friction during the six seconds of turning might cause inertial disk 20 to reach a rate of rotation of 0.4 degrees per second as viewed from inertial space. Therefore, continuing with the example, as the vehicle completes the aforementioned 90 degree turn the relative angular rate between inertial disk 20 and housing 12 would be 14.6 degrees per second and not 15.0 degrees per second as suggested in the ideal case described in the preceding paragraph and angular rate sensor 10 would indicate an angular rate of 14.6 degrees per second at conductor 158 which would not be exactly the correct indication of 15.0 degrees per second.

When the turn is complete and the vehicle is no longer turning, inertial disk 20 continues briefly to rotate, starting at the rotation rate of 0.4 degrees per second with respect to inertial space and the output of angular rate sensor would then indicate an angular rate of 0.4 degrees per second in the opposite direction to the angular rate indicated while the vehicle was turning which also would not be exactly correct. Assuming, which is believed to be a reasonable assumption, that the friction force is approximately constant, inertial disk 20 slows down during the six seconds following the turn and then remains stationary both with respect to the vehicle and as seen from inertial space until the vehicle changes its orientation again.

The basis for the numbers in the preceding two paragraphs is a coefficient of friction of 0.001, assuming the diameter of inertial disk 20 is 80 millimeters, the diameter of shaft 36 is 2 millimeters, and all of the friction is caused by a six degree vehicle tilt causing ten percent of the weight of inertial disk 20 to be applied to the bearings in the radial direction.

The friction and the effects of friction described in the preceding two paragraphs can be greatly reduced or substantially eliminated by using well known technologies. Air bearings of the type using pressurized air to prevent physical contact would reduce friction well below, perhaps to an order of magnitude or more below, the friction described in the aforementioned two paragraphs. Using magnetic bearings of the types well known for supporting flywheels would eliminate all friction except viscous drag between inertial disk 20 and the surrounding air. It is believed that the embodiment described hereinabove illustrates an optimum range of compromises that provide useful designs at attractive manufacturing costs.

Many technologies are known for sensing the rate of rotation of a rotating disk without physical contact and without applying significant force. The magnetic field sensors illustrated in FIG. 1 in combination with the circuit illustrated in FIG. 8 are believed to offer adequate accuracy at low cost.

The operation of the angular rate sensor 10 of the invention will now be described with reference to FIGS. 1 and 8. In operation of electronic circuit 30, clock 144 provides a timing pulse through conductor 146 to control circuit 142 to control it to operate at a constant periodicity such as 10 to 100 times per second. Upon receiving a clock pulse, control circuit 142 examines the outputs of the three magnetic field sensors 32a, 32b and 32c and determines which is sensing the magnetic field closest to zero. The output of the magnetic field sensor indicating closest to zero is connected to the input of differentiator 152. More specifically, if the output of magnetic field sensor 32a indicates a field closest to zero then control circuit 142 directs switch 144a to close to provide the output of magnetic field sensor 32a through conductors 132a, 136a, switch 144a and conductor 148 to differentiator 152. Similarly, if the output of magnetic field sensor 32b indicates a field closest to zero then control circuit 142 directs switch 144b to close and if the output of magnetic field sensor 32c indicates a field closest to zero then control circuit 142 directs switch 144c to close.

After deciding which of the magnetic field sensors 32a, 32b or 32c is at a magnetic field closest to zero and commanding the corresponding switch to close, control circuit 142 examines the output of the magnetic field sensor that is cyclically after the one selected. More specifically, if the output of magnetic field sensor 32a indicates its magnetic field is nearest zero control circuit 142 examines the output of the magnetic field sensor 32b, if the output of magnetic field sensor 32b indicates its magnetic field is nearest zero control circuit 142 examines the output of the magnetic field sensor 32c and if the output of magnetic field sensor 32c indicates its magnetic field is nearest zero control circuit 142 examines the output of the magnetic field sensor 32a. If the output of the magnetic field sensor selected for examination indicates its magnetic field is directed in a negative direction then controlled inverter 154 is directed to invert the output of differentiator 152 and supply the inverted output through conductor 158 to the other parts (not illustrated) of the vehicle. If the output of the magnetic field sensor selected for examination indicates its magnetic field is directed in a positive direction then controlled inverter 154 is directed to supply the output of differentiator 152 without inverting it through conductor 158 to the other parts (not illustrated) of the vehicle. The positive direction may be defined to be either outward or inward so long as all elements of the circuit are connected to give an output having the desired polarity.

When the vehicle is at rest or has been proceeding in one direction for a period of time the inertial disk 20 is stationary and there is no relative rotation of inertial disk 20 with respect to housing 12 and there is no movement of the periphery of inertial disk 20 past magnetic field sensors 32a, 32b and 32c. Under these circumstances angular rate sensor 10 provides an output indicating zero angular rate through conductor 158 because the output of any of the magnetic field sensors 32a, 32b and 32c is constant and the derivative of a constant is zero.

While the vehicle is changing direction, inertial disk 20 does not turn with the vehicle. While inertial disk 20 is not rotating as seen from inertial space, the housing 12 is rotating so that pole pieces 28 and 28' move past magnetic field sensors 32a, 32b and 32c. Each magnetic field sensor sees a magnetic field alternating between a maximum in one direction (inward or outward) and a maximum in the opposite direction. The angular separation of magnetic field sensors 32a, 32b and 32c causes the output of each sensor to be 120 degrees out of phase electrically with the outputs of the other two sensors. At any given time the output of one of the three magnetic field sensors is no more than thirty degrees (in the sense of the phase of the sine wave) from where the magnetic field is zero. Within the range of minus 30 degrees to plus 30 degrees the output of a magnetic field sensor 32a, 32b, or 32c is nearly proportional to the angle of rotation. The derivative of the output is nearly proportional to the rate of rotation of inertial disk 20 with respect to the housing 12 and circuit 30. As described hereinabove, when control circuit 142 receives a clock signal through conductor 146 from clock 144 it selects from magnetic field sensors 32a, 32b and 32c the sensor where there is the smallest magnetic field in absolute magnitude and closes the corresponding one of the switches 144a, 144b and 144c to connect the output of the selected magnetic field sensor with differentiator 152. Because the range of angles is between −30 degrees and +30 degrees the magnetic field varies approximately linearly with the angle of rotation and the absolute magnitude of the output of differentiator 152 indicates the absolute magnitude of the rate of rotation of inertial disk 20. (But the sign may not be the correct sign.) By the process described hereinabove control circuit 142 determines if the output of differentiator 152 needs to be inverted and, if it does, commands controlled inverter 154 to invert the output of differentiator 152 to have an output that indicates both the direction and the magnitude of the rotation of inertial disk 20 with respect to housing 12 which is the rate of rotation of housing 12 about the axis of inertial disk 20 with reference to inertial space. When integrator 184 is included for calculating roll angle, the signal at conductor 188 indicates the angle through which the vehicle has rotated about its roll axis from its initial (normally upright) orientation.

Continuing now with particular reference to FIG. 3, angular rate sensor 10' is the same as angular rate sensor 10 illustrated in FIG. 2 except that sleeve bearings 70 and 80 having bearing surfaces coated with diamond like carbon are provided in place of ball bearings 40 and 50. Shaft 36 is also preferably coated with diamond like carbon. Lower and upper stops 48 and 58 may also be coated with diamond like carbon to minimize friction during upward and downward accelerations and at other times when permanent magnet 66 does not fully counter the force of gravity on inertial disk 20. Except for the substitution of sleeve bearings for ball bearings, angular rate sensor 10' is the same as angular rate sensor 10 and its operation is the same as the operation of angular rate sensor 10 described hereinabove. Housing 12 of angular rate sensor 10' is filled with dry nitrogen to minimize the friction between the surfaces coated with diamond like carbon.

Figure 9:
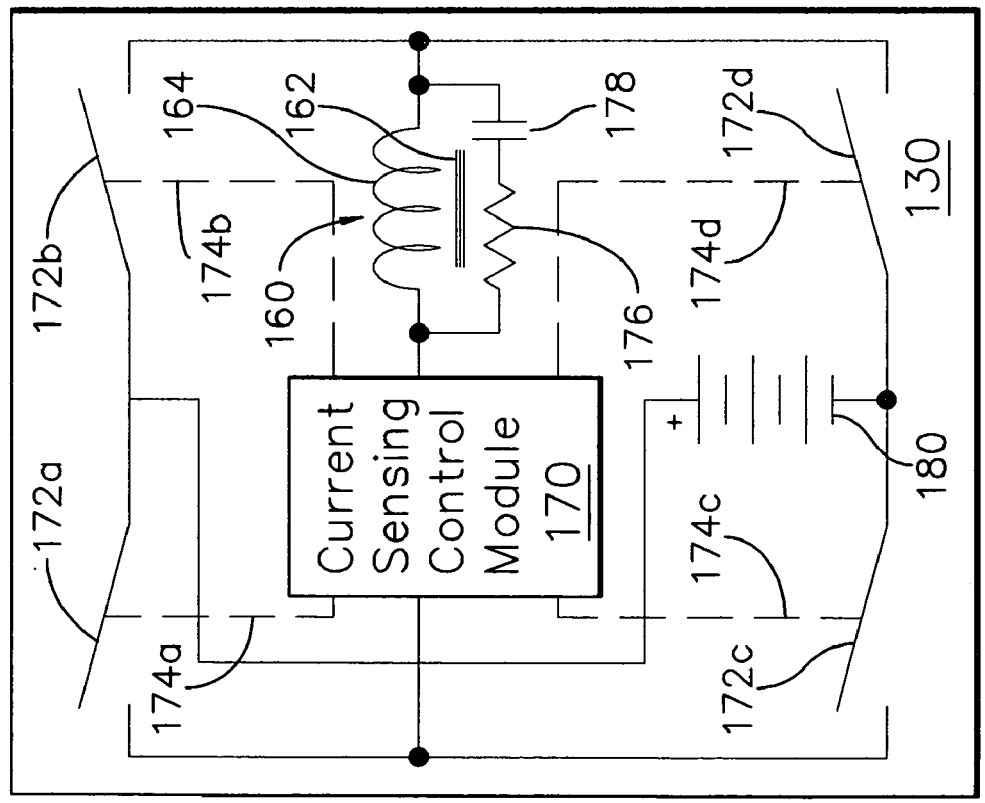
FIG. 9 shows schematically an electronic circuit for controlling the axial position of the inertial disk of the angular rate sensor of the embodiment of the invention illustrated in FIG. 4.

Proceeding now with particular reference to FIGS. 4 and 9, angular rate sensor 10" is the same as angular rate sensor 10 illustrated in FIG. 2 except that permanent magnet 66 with its support 62 and ferromagnetic ring 64 have been removed, enabling bearing 50 to be replaced by bearing 50" which is the same as bearing 40, and electromagnet 160 and circuit 130 have been added. Electromagnet 160 attracts upper rotor 22 thereby opposing the force of gravity on inertial disk 20 and maintaining shaft 36 at an intermediate position between stops 48 and 58. Except for the aforementioned differences, angular rate sensor 10" is the same as angular rate sensor 10 and its operation is the same as the operation of angular rate sensor 10 described hereinabove except for the method of controlling current in coil 164 which is described hereinbelow.

Electronic circuit 130 controls the current in coil 164 of electromagnet 160 to keep shaft 36 of inertial disk 20 at a predetermined axial position between stops 48 and 58 thereby preventing friction between shaft 36 and stops 48 and 58 when inertial disk 20 is rotating with respect to housing 12.

Electronic circuit 130 comprises electromagnet 160, current sensing control module 170, four switches 172a, 172b, 172c and 172d, resistor 176, capacitor 178 and power source 180. Power source 180 is illustrated as a battery within electronic circuit 130 but would normally be a source deriving its power from the vehicle battery. Current sensing control module 170 includes current sensing means responsive to the electric current in coil 164, a clock and calculating means.

Electromagnet 160 comprises a ferromagnetic ring 162 having a "C" shaped cross section and a solenoid coil 164 wound on a bobbin 166 to form a conventional lifting type of electromagnet. Ferromagnetic ring 162 is preferably made of a ferromagnetic material selected to minimize magnetic hysteresis. Annealed iron or low carbon steel are preferred. Coil 164 is preferably a conventional coil wound of copper magnet wire on a molded plastic bobbin 166 in a manner known to be suitable by persons skilled in the art of making electromagnets.

Current sensing control module 170 is connected so that the current passing through coil 164 also passes through module 170 where the current is sensed. Current sensing control module 170 is also connected as indicated by dashed lines 174a, 174b, 174c and 174d for controlling the on or off condition of switches 172a, 172b, 172c and 172d respectively. Switches 172a, 172b, 172c and 172d are preferably semiconductor switches comprising such as MOSFET power transistors. Resistor 176 and capacitor 178 are provided for limiting and damping inductive spikes caused by operation of switches 172a, 172b, 172c and 172d.

The operation of the angular rate sensor 10" of the invention for the purpose of maintaining inertial disk 20 at a predetermined axial position will now be described with reference to FIGS. 4 and 9. At a predetermined frequency which might be in the range of 100 to 5000 times per second current sensing control module 170 operates to sense the separation between ferromagnetic ring 162 and upper rotor 22 of inertial disk 20 and the rate of change of that distance. From the difference between the actual separation and the desired separation, current sensing control module 170 computes an axial force required to move inertial disk 20 up or down to bring the separation to the desired predetermined distance in a desired time. Control module 170 then calculates the required current in coil 164 of electromagnet 160 to produce the required force and overcome the force of gravity.

Finally, if the current in coil 164 is less than the current calculated to provide the required force and overcome gravity, then current sensing control module 170 operates to increase the current in coil 164. Or, if the current in coil 164 is greater than the current calculated to provide the required force and overcome gravity, then current sensing control module 170 operates to reduce the current in coil 164. The current in coil 164 is controlled by switches 172a, 172b, 172c, and 172d The operation of the switches 172a, 172b, 172c, and 172d to control the current in coil 164 is described in the following.

If the current in coil 164 must be increased and switches 172a and 172d are not closed then current sensing control module 170 commands switches 172b and 172c to open and, after allowing sufficient time for switches 172b and 172c to open, current sensing control module 170 commands switches 172a and 172d to close. Switches 172a and 172d apply the voltage of battery 180 across coil 164 and the current in coil 164 increases at a rate determined by the reactance of coil 164 and the battery voltage.

If the current in coil 164 is greater than the current calculated to provide the required force then current sensing control module operates to decrease the current in coil 164. If switches 172b and 172c are not closed then current sensing control module 170 commands switches 172a and 172d to open and, after allowing sufficient time for switches 172b and 172c to open, current sensing control module 170 commands switches 172b and 172c to close. Switches 172b and 172c apply the voltage of battery 180 across coil 164 in the negative direction and the current in coil 164 decreases at a rate determined by the reactance of coil 164 and the battery voltage.

After a period of time which is the inverse of the aforementioned predetermined frequency, current sensing control module 170 repeats the process just described. It again measures the separation between ferromagnetic ring 162 and upper rotor 22 and sets switches 172a, 172b, 172c, and 172d to control the current to maintain ferromagnetic ring 162 and upper rotor 22 of inertial disk 20 at the predetermined desired separation from each other. The frequency is set to a predetermined value selected so that only modest changes of current occur during a cycle but so that the changes are large enough that the time rate of change of current can be determined for determining the inductance of coil 164.

The elements of the process outlined in the preceding four paragraphs for controlling the separation between ferromagnetic ring 162 and upper rotor 22 are described in detail in the following paragraphs: Current sensing control module 170 ascertains the separation between ferromagnetic ring 162 and upper rotor 22 of inertial disk 20 from the inductance of coil 164. This is possible because the inductance of coil 164 increases as the separation between ferromagnetic ring 162 and upper rotor 22 decreases so long as ferromagnetic ring 162 is not saturated. After determining the space between ferromagnetic ring 162 and upper rotor 22, current sensing control module 170 limits the current in coil 164 to currents that cannot cause saturation of ferromagnetic ring 162.

Current sensing control module 170 determines the inductance of coil 164 by measuring the rate of change of current with time. The inductance L is calculated according to:

$$L = (E - I \cdot R)/\text{rate of change of current with time}$$

where E is the voltage applied to coil 164, I is the current in coil 164 and R is the resistance of coil 164. The combination (E−I·R) is the voltage operating to increase or decrease the current in coil 164 which is the voltage E applied to coil 164 less the resistive loss I·R. Determining the rate of change of current with time requires the current to be known at two different points in time. Therefore, current sensing control module 170 remembers the current at the end of the previous time period. At the end of a time period, current sensing control module 170 computes the inductance from the current $I_0$ at that time and the current $I_{-1}$ at the end of the previous time period according to:

$$L = (E - I \cdot R) \cdot T / (I_0 - I_{-1})$$

where T is the duration of a time period, $I_0$ is the current in coil 164 at the end of the current time period and $I_{-1}$ was the current in coil 164 at the end of the previous time period. A suitable value for I in the numerator is the average of $I_0$ and $I_{-1}$ which is the average current in coil 164 over the latest time period.

The relationship between the inductance L and the separation between ferromagnetic ring 162 and upper rotor 22 is determined by the materials and geometry of the ferromagnetic ring 162 and upper rotor 22 of inertial disk 20 and the number of turns in coil 164. This relationship is a constant for the design and is built into current sensing control module 170 during manufacture. The relationship may be expressed as a table giving the separation for each value of inductance or as a function giving the separation as a function of inductance. Therefore, current sensing control module 170 determines the separation between ferromagnetic ring 162 and upper rotor 22 of inertial disk 20 by computing the inductance L by a method such as the method described hereinabove and using the known relationship between inductance L and the separation to estimate the separation.

The method for determining the force for bringing inertial disk 20 to a desired axial position is described in the following. The force to bring inertial disk 20 to the desired axial position is determined according to the method described below by determining the appropriate case and proceeding according to the procedure given for that case. It is first required to determine the axial velocity V of inertial disk 20. The axial velocity is computed from:

$$V = (S_{-1} - S_0)/T$$

where T is the duration of a time period, $S_0$ is the separation between ferromagnetic ring 162 and upper rotor 22 of inertial disk 20 at the present time and $S_{-1}$ was the separation at the end of the previous time period.

Case 1) If inertial disk 20 is moving toward the desired axial position at the beginning of the cycle the constant upward force F that will bring it to a stop at the desired position is computed according to the formula:

$$F = M \cdot g \pm M \cdot V^2 / (2 \cdot S) \qquad (1)$$

where F is the required upward force, M·g is the weight of inertial disk 20 (assuming yaw is being sensed and the axis of inertial disk 20 is approximately vertical), $V^2$ is the square of the velocity of inertial disk 20 toward the desired position and S is the distance from the desired position. If inertial disk 20 is moving upward the "−" sign applies and if inertial disk 20 is moving downward the "+" sign applies. If the velocity V is small and inertial disk 20 is more than a small distance from the desired position it may be preferred to use a smaller stopping force (e.g. use a smaller value than the correct value for V in expression (1)) than calculated from expression (1) to bring inertial disk 20 to the desired position more rapidly. Upon startup or for even more rapid upward movement of inertial disk 20 toward the desired position, the current in coil 164 may be set to a predetermined level such as a current approaching the current that saturates ferromagnetic ring 162. Another special case is when the force calculated from expression (1) is negative. This indicates that inertial disk 20 is moving upward and downward force is needed which electromagnet 160 cannot provide. In this case the current in coil 164 is held to zero until gravity stops the upward movement and the required force calculated from expression (1) is no longer negative.

Case 2) If inertial disk 20 is stopped or is moving away from the desired position at the beginning of the cycle and the actual separation of inertial disk 20 from electromagnet 160 is greater than the desired separation, it is first necessary to initiate movement of inertial disk 20 toward the desired position. To initiate movement toward the desired position the current in coil 164 is set to a predetermined level which might be in the range of one third to two thirds of the current that saturates ferromagnetic ring 162. That current will cause inertial disk 20 to begin moving toward the desired position. After movement toward the desired position has reached a predetermined velocity the process described under Case 1 is employed to bring inertial disk 20 to its desired position.

Case 3) If inertial disk 20 is stopped or is moving away from the desired position at the beginning of the cycle and the actual separation of inertial disk 20 from electromagnet 160 is less than the desired separation, it is first necessary to initiate movement of inertial disk 20 toward the desired position. To initiate movement the current in coil 164 is set to approximately zero to allow gravity to stop the upward movement of inertial disk 20 and start the desired downward movement. After inertial disk 20 begins moving toward its desired position the process described under Case 1 is employed to bring inertial disk 20 to its desired position.

In the preceding, a particular design and algorithm have been described for maintaining inertial mass 20 of angular rate sensor 10" at a desired position.

Other designs and algorithms known by those skilled in the relevant arts to be suitable for keeping inertial disk 20 at its desired axial position may be substituted for the design and algorithm described hereinabove with reference to FIGS. 4 and 9.

Figure 5:
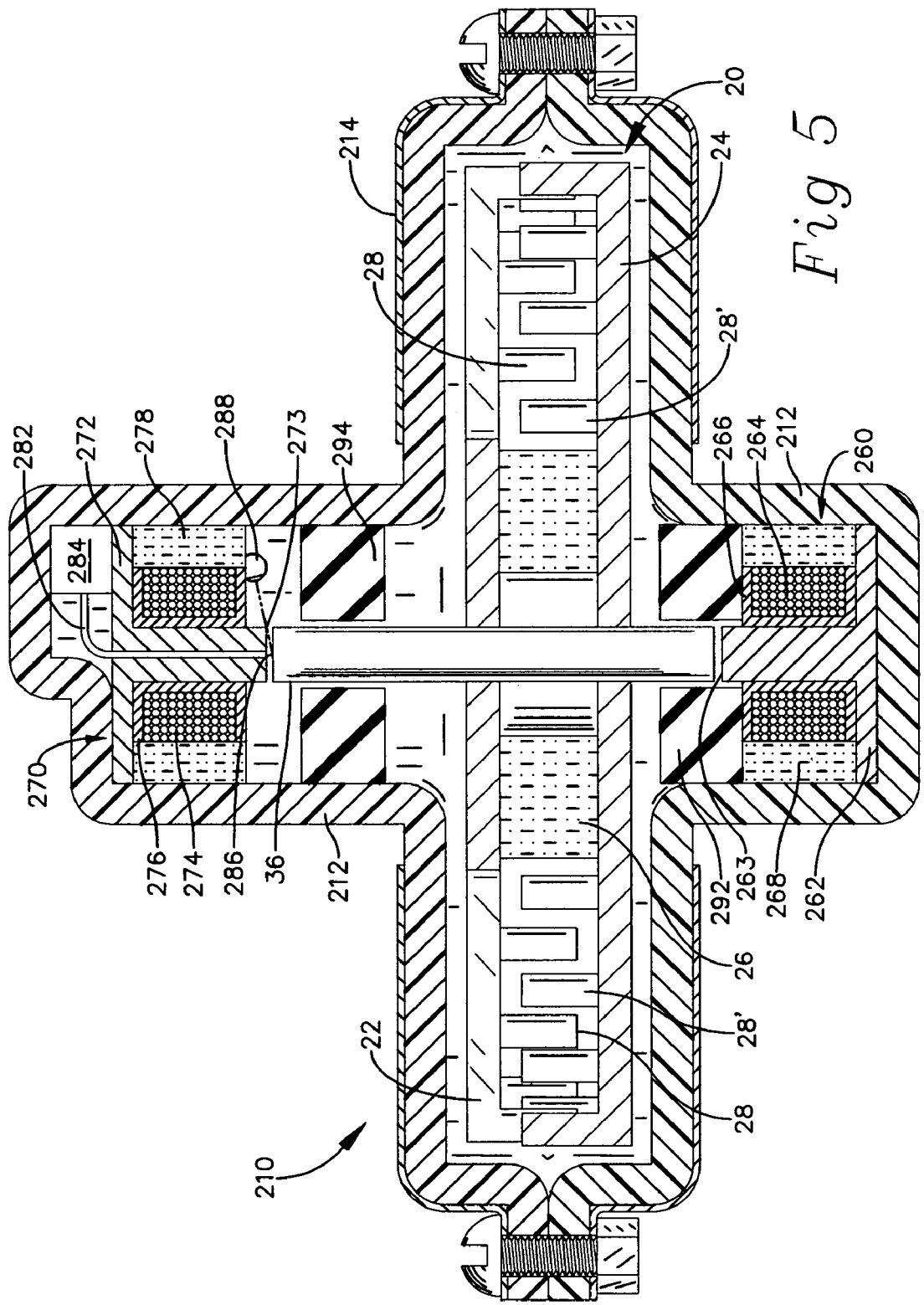
FIG. 5 shows a side view of the angular rate sensor of the invention illustrated in FIG. 2 but with no mechanical bearings and the armature suspended magnetically between two magnetic pole pieces.

Proceeding now with particular reference to FIG. 5, angular rate sensor 210 is similar to angular rate sensor 10 illustrated in FIG. 2 in that the inertial disk 20, magnetic field sensors 32a, 32b, and 32c and the electronic circuit 30 for determining the angular rate from the output of the magnetic field sensors may be the same. However, the design illustrated in FIG. 5 is intended to be smaller and cost less than the other designs. In the angular rate sensor 210 illustrated in FIG. 5 there are the following differences from the angular rate sensor 10 illustrated in FIG. 2: (1) all bearings have been replaced by magnetic bearings comprising a lower magnet 260 and an upper magnet 270; (2) high hysteresis rubber washers 292 and 294 are provided to limit cross axis excursions of shaft 36; (3) a light source 284, a light conducting fiber 282, and light sensor 288 are provided for determining the axial position of inertial disk 20; (4) the housing 212 is formed of plastic and magnetic shields 214 are provided to protect against stray magnetic fields; and (5) a circuit 330 responds to light received by the light sensor 288 by controlling the electric current in coils 264 and 274 which controls the magnetic strength of magnets 260 and 270 which, in turn, controls the axial position of inertial mass 20.

Lower magnet 260 comprises a ferromagnetic core 262 having a "T" shaped cross section with a magnet pole 263 at the base of the "T", a coil 264 wound on a bobbin 266 and a tubular permanent magnet 268. Magnet pole 263 is located in close proximity to the lower end of shaft 36 of inertial disk 20 for applying magnetic force thereto. Upper magnet 270 comprises a ferromagnetic core 272 having a "T" shaped cross section with a magnet pole 273 at the base of the "T", a coil 274 wound on a bobbin 276 and a tubular permanent magnet 278. Magnet pole 273 is located in close proximity to the upper end of shaft 36 of inertial disk 20 for applying magnetic force thereto. Upper magnet 270 also has an axial passage providing passage for light conducting fiber 282 for transmitting light from light source 284 to illuminate spot 286. Light source 284 is preferably a semiconductor laser diode. Light sensor 288 senses the light from illuminated spot 286 that is not blocked by edge 273 from reaching light sensor 288. Light sensor 288 may be a light sensing diode responsive to the light supplied by light source 284.

High hysteresis washers 292 and 294 may be made of any of the known rubberlike materials characterized by minimum "bounce". The inner diameters of washers 292 and 294 may be coated with a low friction material or may be provided with an inner sleeve or ball bearing offering a low coefficient of sliding friction (not illustrated). The low coefficient of friction minimizes the transfer of angular momentum to inertial disk 20 when there is contact between washers 292 and 294 and shaft 36.

Figure 10:
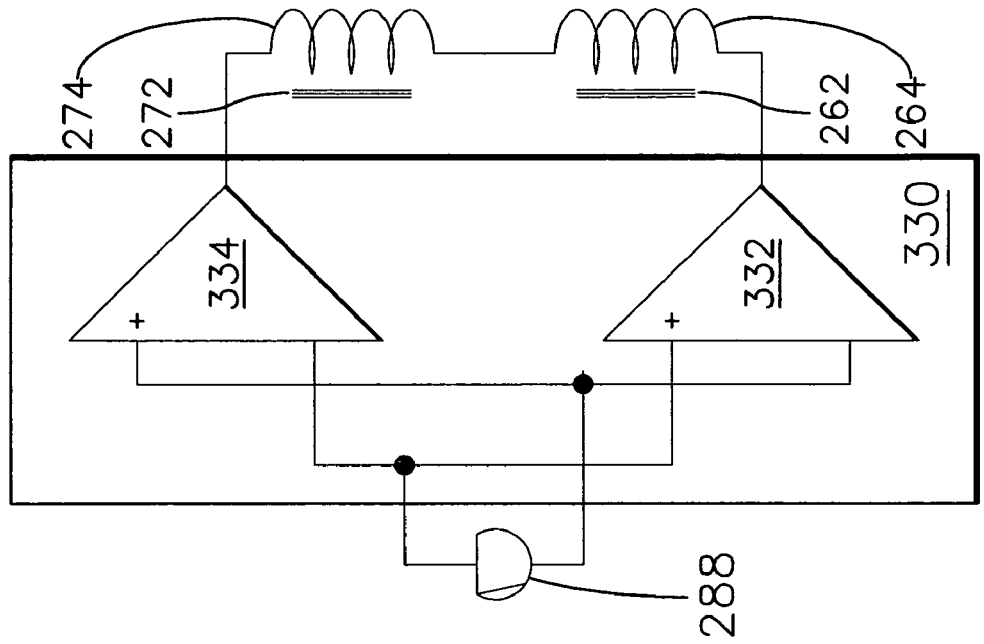
FIG. 10 shows schematically an electronic circuit for controlling the axial position of the inertial disks of the angular rate sensors of the embodiments of the invention illustrated in FIGS. 5 and 7.

Proceeding now with reference to FIGS. 5 and 10, axial position control circuit 330 comprises two amplifiers 332 and 334 connected for controlling the current in coils 264 and 274 of lower magnet 260 and upper magnet 270 respectively. The current is controlled to current levels that keep inertial disk 20 at a predetermined axial position where it does not contact ferromagnetic poles 263 and 273 to prevent friction between shaft 36 and ferromagnetic poles 263 and 273 when inertial disk 20 is rotating with respect to housing 212. Amplifiers 332 and 334 may be any amplifiers that have input stages compatible with the output of light sensor 288 and output stages suitable for sourcing or sinking the current required by coils 264 and 274. The signal from light sensor 288 applied to amplifier 332 is the inverse of the signal applied to amplifier 334 causing the output of amplifier 332 to be high when the output of amplifier 334 is low and conversely. Varying the inputs to amplifiers 332 and 334 over the full range of outputs of light sensor 288 causes the electric current in coils 264 and 274 to range between: a large current in one direction that counteracts permanent magnet 268 and reduces the magnetic field at pole 263 to substantially zero; and a large current in the opposite direction that counteracts permanent magnet 278 and reduces the field at pole 273 to substantially zero.

The operation of the angular rate sensor 210 of the invention will now be described with reference to FIGS. 5 and 10 with particular attention to the method for maintaining inertial disk 20 at a predetermined axial position. In operation of the system, when power is first applied, shaft 36 is either in contact with pole 273 of upper magnet 270 or is in contact with pole 263 of lower magnet 260 because of the magnetization caused by permanent magnets 268 and 278.

The operation of the angular rate sensor 210 will now be described for the case when shaft 36 is in contact with magnet pole 263 when power is first turned on. In this case the light reflected by illuminated spot 286 has a direct path to light sensor 288 and the output of light sensor 288 is at its maximum output. The high output is applied across the inputs of amplifier 334 and its inverse is applied across the inputs of amplifier 332. The output of amplifier 334, therefore, goes to a high level and the output of amplifier 332 goes to a low level. The amplifier outputs in combination cause electric current to flow from the output of amplifier 334 through coils 274 and 264 to the output of amplifier 332. The polarity of permanent magnets 268 and 278 is such that current in coil 274 causes a magnetic field that augments the field of permanent magnet 278 and causes the magnetic flux at pole 273 to increase and be greater than the flux caused by permanent magnet 278 alone. The current in coil 264 causes a magnetic field that opposes the field of permanent magnet 268 and causes the magnetic flux at pole 263 to decrease to substantially zero. The increased flux at pole 273 causes it to apply an increased magnetic force to shaft 36 while the substantially zero flux at pole 263 causes it to apply substantially no magnetic force to shaft 36. Consequently, substantially the entire magnetic force applied to shaft 36 is the strong upward force at pole 273 caused by the combined fields of permanent magnet 278 and coil 274.

When the maximum voltage is being applied to the coils 264 and 274 connected in series, pole 273 attracts shaft 36 and causes inertial disk 20 to move away from pole 263 of lower magnet 260 and toward pole 273 of upper magnet 270. This causes the illuminated spot 286 on shaft 36 to approach pole 273. At a predetermined position the line of sight from the illuminated spot 286 to light sensor 288 (indicated by a phantom line in FIG. 5) begins to be blocked and the output of light sensor 288 diminishes as the light it receives diminishes. The diminished output of light sensor 288 causes the output of amplifier 334 to become smaller and the output of amplifier 332 to become larger causing a smaller voltage across the series combination of coils 264 and 274. The current in the coils diminishes as the amplifier input voltages change, and the net magnetic force causing inertial disk 20 to move toward magnet 270 diminishes. As the movement of inertial disk 20 continues, a position is reached where the total force on shaft 36 (including gravity if the axis of shaft 36 is vertical) balances and a stable operating position is established. The stable operating position is preferably the position where the currents in coils 264 and 274 is zero. Making the stable operating position be the position where the currents in coils 264 and 274 is zero is accomplished by setting the offsets of amplifiers 332 and 334 so that the outputs of the two amplifiers are equal when the light sensor input is at the output level that occurs when inertial disk 20 is at the position where the forces of magnets 270 and 260 balance the weight of inertial disk 20 in the absence of current in coils 264 and 274. Viscosity of the air surrounding inertial disk 20 operates to further stabilize disk 20 to keep it in the aforementioned stable operating position.

The operation of the angular rate sensor 210 will now be described for the case when shaft 36 is in contact with pole 273 of magnet 270 when power is first turned on. The process described in the preceding paragraph is reversed. Initially very little light is reaching light sensor 288 and the output of light sensor 288 is at its lowest level. The low output is applied across the inputs of amplifier 334 and its inverse, which is a high level, is applied across the inputs of amplifier 332. The output of amplifier 334, therefore, goes to a low level and the output of amplifier 332 goes to a high level. The amplifier outputs in combination cause electric current to flow from the output of amplifier 332 through coils 274 and 264 to the output of amplifier 334. The current in coil 274 causes a magnetic field that opposes the field of permanent magnet 278 and causes the magnetic flux at pole 273 to decrease to approximately zero. The current in coil 264 causes a magnetic field that augments the field of permanent magnet 268 and causes the magnetic flux at pole 263 to increase and be greater than the flux caused by permanent magnet 268 alone. The decreased flux at pole 273 causes it to apply a minimal magnetic force to shaft 36 while the increased flux at pole 263 causes it to apply a large magnetic force to shaft 36.

When the maximum voltage is being applied to the series combination of coils 264 and 274 the two magnets 260 and 270, in combination, cause inertial disk 20 to move away from pole 273 and toward pole 263. Accordingly, the illuminated spot 286 on shaft 36 moves away from pole 273 making the illuminated spot more and more visible to light sensor 288 (indicated by a phantom line in FIG. 5) and the output of light sensor 288 increases as the light it receives increases. The increased output of light sensor 288 causes the output of amplifier 334 to become larger and the output of amplifier 332 to become smaller causing a smaller (in absolute value) voltage across the series combination of coils 264 and 274. The current in the coils diminishes accordingly and the magnetic force moving inertial disk 20 toward lower magnet 260 diminishes. As the movement of inertial disk 20 continues, inertial disk 20 reaches a position where the axial force on shaft 36 (including gravity) is zero and the stable operating condition is established.

There may also be circumstances that cause inertial disk 20 to move perpendicular to the axis of magnets 260 and 270. Small movements are damped by eddy current losses in the regions of shaft 36 that are nearest magnet poles 263 and 273. Larger movements may occur during such as rapid braking or impact with such as a pothole or curb. When that happens movement beyond an allowed movement is prevented by high hysteresis rubber washers 292 and 294 or, if so equipped, the bearings affixed to their inner diameters. The high hysteresis rubber of which washers 292 and 294 are made does not cause shaft 36 to bounce back, rather, it brings radial movement of shaft 36 to approximately a stop. After being stopped shaft 36 is returned to its normal radial position by the attractive forces of magnets 260 and 270 and the movement is dampened by the aforementioned eddy current losses and aerodynamic drag which prevents continuing vibration.

Angular rate sensor 210 operates to sense angular rotation just as the embodiment of the invention illustrated in FIGS. 1 and 8, the operation of which is described in detail hereinabove with reference to FIGS. 1 and 8.

Figure 7:
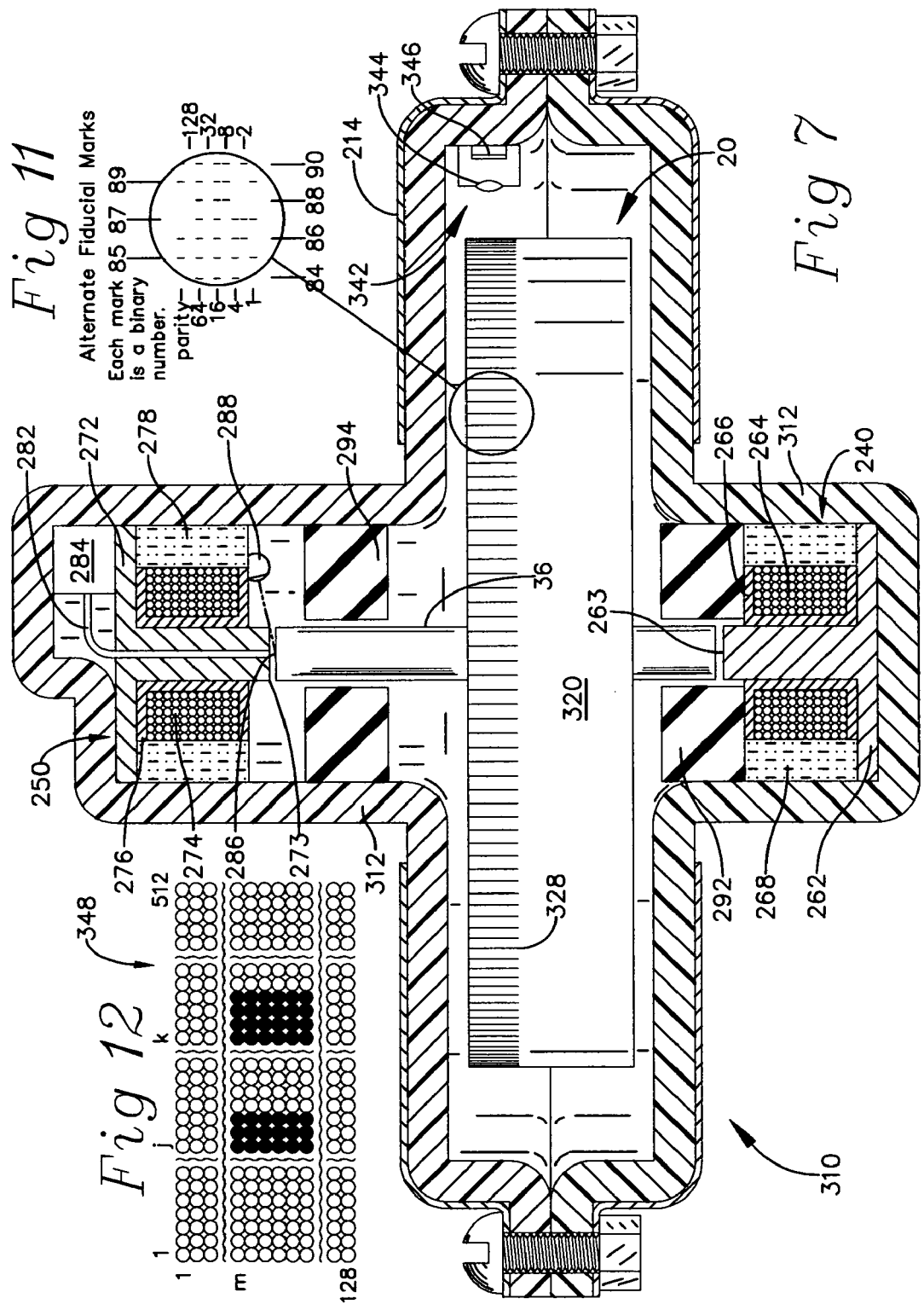
FIG. 7 shows a side view partially in section of the angular rate sensor of the invention as illustrated in FIG. 5 but having an inertial mass adapted for optical rotation sensing.

Proceeding now with particular reference to FIGS. 7, 11, and 12, angular rate sensor 310 is similar to angular rate sensor 210 illustrated in FIG. 5 in that its inertial disk 320 is supported on the same magnetic bearings. Angular rate sensor 310 differs in the following ways from angular rate sensor 210: (1) inertial disk 20 of angular rate sensor 210 has been replaced by inertial disk 320 which does not have magnetic poles on its outer circumference, rather it has visible fiducial marks 328 on its outer circumference; (2) magnetic field sensors 32a, 32b, and 32c are replaced by one or more digital cameras 342 that receive and analyze images of the fiducial marks 328; and (3) the fiducial marks 328 are illuminated by a light source (not illustrated) to make them visible to digital camera 342. Housing 312 differs from housing 212 by being adapted for one or more digital cameras 342 to be mounted thereon. Other parts may be the same as the corresponding parts of angular rate sensor 210 and are identified by the same numbers. FIG. 11 illustrates as an alternate to the fiducial marks illustrated in FIG. 7, fiducial lines that each indicate a unique angular position of inertial disk 310. FIG. 12 illustrates an array of light sensing cells for sensing optical images of fiducial marks 328.

Inertial disk 320 is preferably a disk comprising a flat plate with a circular circumference made of an inexpensive material such as mild steel. It is attached to axle 36, preferably by press fitting or other means known to be suitable by those skilled in the art of making rotating disks. Another preferred design is to make inertial disk 320 of zinc die cast about axle 36 and to make the fiducial marks during the process of die casting. The fiducial marks 328 may be vertical lines as illustrated in FIG. 7 or each of them may be unique such as the binary codes illustrated in FIG. 11. Fiducial marks 328 may be formed by a method such as laser marking using conventional laser marking machines. In larger production volumes the fiducial marks 328 are preferably formed by impressing with such as a hardened tool or in a die casting process. The fiducial marks illustrated in FIG. 7 are appropriate if only the rate of rotation is to be sensed. Unique fiducial marks such as, for example, each fiducial mark being a binary number as illustrated in FIG. 11 enables the exact angular position of inertial disk 320 to be measured.

FIG. 11 illustrates an example in which each fiducial mark 328 is a binary number that uniquely identifies an angular position of inertial disk 320. In FIG. 11, each fiducial mark 328 comprises nine segments, some of which may be absent. Eight of the segments indicate in binary notation a number between 0 and 255. The ninth segment is a parity bit providing an error check and assuring that there is at least one fiducial mark in every one of the 256 positions on the circumference of inertial disk 320. FIG. 11 illustrates fiducial marks that are binary numbers indicating positions 84 through 90 of the 256 positions that can be indicated by nine bit fiducial marks at the circumference of inertial disk 320.

Camera 342 comprises a lens 344, and a focal plane light sensor 346 having an array of light sensing pixels. Light sensor 346 is preferably a CMOS active pixel image sensor comprising an array 348 of light sensors located in the plane where the images of fiducial marks 328 are focused by lens 344.

Light sensor 346 comprises a single integrated circuit including array 348 and sufficient computational circuitry to repeatedly analyze the image sensed by the light sensing array 348 and compute the angular velocity of inertial disk 320 from the timing of the changes observed in the images of fiducial marks 328. For certain applications wherein each fiducial mark on inertial disk 320 is unique, light sensor 346 includes additional computational circuitry for determining the angular orientation of inertial disk 320 relative to housing 312.

The operation of the angular rate sensor 310 of the invention will now be described with reference to FIGS. 7, 11 and 12 with particular attention to the method for determining the rate of rotation and angular position of inertial disk 320. The following description proceeds with particular reference to the exemplary CMOS active pixel image sensor having an array of 128×512 pixels illustrated in FIG. 12. The following description also proceeds with particular reference to two exemplary types of fiducial marks; (1) an array of lines all having the same length, and (2) an array of lines each broken into nine segments wherein each segment indicates a parity bit or a bit of a binary number.

In operation of the angular rate sensor 310 of the invention, the image of a fiducial mark falling on image sensor 346 causes a block of pixels of the array 248 to have a different state than the adjacent pixels on which an image of a fiducial mark is not focused. In FIG. 12 two blocks of pixels in array 248 are in a different state than the remaining pixels. The pixels in the different state are indicated by darkening. The number of rows affected by the images of the fiducial marks may be a small number such as eight or ten out of the 128 rows if only the image of a parity bit such as one of the parity bits illustrated in FIG. 11 is focused on the array; or it could be a larger number such as 80 to 128 rows if all of the fiducial marks are long fiducial marks as illustrated in FIG. 7.

The operation of the angular rate sensor 310 in the case when all of the fiducial marks 328 are the same length as illustrated in FIG. 7 will now be described. In FIG. 12 the light sensing cells in certain columns are darkened in rows m and for a number of rows below row m indicating that the images of fiducial marks 328 are focused on those pixels. There are no illuminated light sensing cells above row m because all fiducial marks end at the top of inertial disk 320 and light focused on rows above row m would originate from above inertial disk 320 where there is no light. The row m on which the images of the uppermost parts of fiducial marks at the top of inertial disk 320 are focused varies as inertial disk 320 moves upward and downward axially within the limits defined by magnet poles 262 and 272.

The computational circuitry included in a CMOS active pixel image sensor can be designed to enable image sensor 346 to operate to identify groups of pixels, all members of which are indicating they have an amount of light focused on them that indicates that the image of a fiducial mark is focused on an area including those pixels. Two such groups of pixels are illustrated in FIG. 12, one group beginning in column j and the other group beginning in column k. The computational circuitry of image sensor 346 operates to repeatedly identify groups of pixels on which the image of a fiducial mark is focused, after which the computational circuitry on image sensor 346 further in each repetition:

(1) calculates a mean value for the horizontal position (i.e. column number) of each of the groups of pixels;

(2) subtracts the previous value of the mean horizontal position of each of the groups of pixels to obtain an incremental change in the position of each of the groups of pixels;

(3) computes a velocity for each group of pixels by dividing the incremental change in position by the time interval between the present time and the last time the horizontal position of the group of pixels was calculated;

(4) computes an average velocity by making a running average of the measured velocities; and (5) saves the current position of each group of pixels for calculating the next incremental changes of positions.

There are many known rules for making a running average but the preferred method is believed to be the process of multiplying the previous value of the running average by a factor "X" and multiplying the average of the most recently computed velocities by the factor "1-X" and adding the two together. Expressed as a formula:

$$Vavg_n = Vavg_{n-1} \cdot X + Vrecent \cdot (1-X)$$

where $Vavg_n$ is the computed average velocity, $Vavg_{n-1}$ is the previously computed average velocity, Vrecent is the velocity most recently computed which is the average of the several velocities computed for the current time period, X is a number that is believed to be preferably in the range of 0.9 to 0.99. The value of X would be made larger (e.g. 0.99) to average over a larger number of velocity values. This might be required if velocity values fluctuate randomly by large amounts.

Any other process for processing digital images known to be suitable by those skilled in the art of processing digital images for processing the digital images of fiducial marks 328 may be substituted for the processes described hereinabove for processing the digital images of fiducial marks 328.

The operation of the angular rate sensor 310 of the invention will now be described for the case when the fiducial marks are unique to enable angular position measurement. An example of unique fiducial marks is the array of binary numbers illustrated in FIG. 11. The darkened pixels of FIG. 12 may be viewed, for the present case, as illustrating the pixels onto which the parity bits of two fiducial marks are focused. The parity bits are focused on pixels in a range of rows beginning at row m and extending several rows below row m. Pixels in rows above row m are not darkened because all fiducial marks end at the top of inertial disk 320 and light focused on pixels above row m would come from above inertial disk 320 where there is no light. The row m that receives the image of the top of inertial disk 320 varies as the fiducial marks of inertial disk 320 move as inertial disk 320 moves within the limits defined by magnet poles 262 and 272.

The logic circuitry of image sensor 346 identifies the top row m and calculates onto which rows of pixels each of the segments of the fiducial marks are focused and which rows of pixels are located where gaps between segments of fiducial marks are focused. Identifying pixels responsive to light from gaps between bits of fiducial marks enables those pixels to be ignored.

The logic circuitry of CMOS image sensor 346 determines from the pixels receiving images of segments of fiducial marks, by binary arithmetic or other means such as table lookup, the angular positions on inertial disk 320 identified by the fiducial marks imaged on the pixels of digital camera 342. Those angular positions may be, for example, the angular positions of inertial disk 320 when it is oriented for each fiducial mark so that a line from the axis of inertial disk 320 through that fiducial mark intersects the center of the lens 344 of digital camera 342.

The angular position so determined is refined for each imaged fiducial mark by adjusting the angular position indicated by the fiducial mark by an amount that is proportional to the horizontal distance from the center of the active cell array 342 (i.e. the distance from column 256 in the example) to the columns containing the pixels responding to the image of the fiducial mark. This adjustment is made for each of the fiducial marks focused on the cell array 342 and the average of the refined positions is calculated. The refined angular positions are all approximately equal. The average of the refined angular positions is believed to be a better angular position measure than any of the individual measurements.

In addition performing to the steps described hereinabove for the case when the fiducial marks are unique, the logic circuitry also ascertains the rate of rotation of inertial disk 320 by performing all of the steps described hereinabove when describing the operation of the angular rate sensor 310 in the case wherein all of the fiducial marks 328 are the same length as illustrated in FIG. 7.

Instead of one camera 342, two cameras 342 may be placed at opposite sides of inertial disk 320. The rates of rotation (and, for certain applications, the angular positions) are determined by the two cameras 342 each independently calculating the rate of rotation (and, for the aforementioned certain applications, the angular position). The two rates of rotation are averaged to obtain a best value for the rate of rotation (and, for the aforementioned certain applications, the two angular positions are averaged to obtain a best value for the angular position). Using two cameras 342 rather than one and averaging the two readings operates to cancel much of the measurement error that can be caused by cross axis movement of inertial disk 320. This can be understood by noting that if two cameras 342 are observing opposite sides of an inertial disk 320 moving in a cross axis direction across the fields of view of the two cameras 320, one camera 320 will see a reduced velocity of fiducial marks 328 and the other camera 320 will see an increased velocity of fiducial marks 328 and averaging the two velocities operates to cancel the effect of the cross axis movement of inertial mass 320 while retaining the measurement of rotation.

Although the description of this invention has been given with reference to a particular embodiment, it is not to be construed in a limiting sense. Many variations and modifications will now occur to those skilled in the relevant arts. For a definition of the invention reference is made to the appended claims.

What is claimed is:

1. A sensor mountable in a vehicle for providing a rotation signal responsive to rotation of said vehicle about a vehicle axis, and comprising:
    a rotor having a rotor axis about which it is free to rotate, said rotor axis being fixed relative to said vehicle and parallel to said vehicle axis; and
    rotation sensing means responsive to rotation of said rotor about said rotor axis by providing said rotation signal.

2. The invention as defined by claim 1, and including a bearing for bearing said rotor in its said rotation about said rotor axis, and wherein:
    said rotor is adapted to be urged by a magnetic field, and
    said bearing comprises a magnet adapted for providing a magnetic field for urging said rotor.

3. The invention as defined by claim 2, and wherein said magnet comprises a permanent magnet.

4. The invention as defined by claim 2, and wherein said magnet comprises an electromagnet.

5. The invention as defined by claim 4, and including electric current control means for providing a controlled electric current to said electromagnet.

6. The invention as defined by claim 5, and wherein said electric current control means is adapted to control said current to keep said rotor at a predetermined axial position.

7. The invention as defined by claim 6, and wherein said electromagnet has an inductance that varies with the axial position of said rotor and said electric current control means controls said current to keep said inductance at a predetermined inductance, whereby said electric current control means controls said current to keep said rotor at said predetermined axial position.

8. The invention as defined by claim 1, and wherein:
    said rotation sensing means comprises a magnetic field sensor, and said rotor is adapted to provide a varying magnetic field at said magnetic field sensor when said rotor rotates about said rotor axis.

9. The invention as defined by claim 8, and wherein:

said rotor comprises a first ferromagnetic element receiving magnetic flux from one pole of a permanent magnet and a second ferromagnetic element receiving magnetic flux from the other pole of said permanent magnet, each of said ferromagnetic elements has a multiplicity of pole elements, and each said pole element of one of said ferromagnetic elements is located between two of said pole elements of the other of said ferromagnetic elements for producing said varying magnetic field, whereby said pole elements present an alternating magnetic field to said magnetic field sensor when said rotor rotates relative to said magnetic field sensor.

10. The invention as defined by claim 1, and wherein said rotor axis is parallel to the roll axis of said vehicle, and including means for integrating said rotation signal to obtain a roll angle signal indicating the angle through which the vehicle has rolled.

11. An angular rate sensor comprising:

a first member and a second member, said first member being rotatable relative to said second member, a visible element movable with said first member, a camera fixed with respect to said second member, said camera comprising an array of light sensing cells and a means for computing, and means for causing light from said visible element to form an image on said array of light sensing cells, and wherein:

each said light sensing cell is responsive to said image by providing an intensity signal responsive to the amount of light being received, said means for computing is connected for receiving said intensity signals, and said means for computing is adapted for calculating the velocity of said image, whereby said velocity indicates the rate of rotation of said first member relative to said second member.

12. The invention as defined by claim 11, and including a bearing adapted for bearing said first member to rotate freely relative to said second member about an axis parallel to the yaw axis of a vehicle, whereby said angular rate sensor is a yaw rate sensor for a vehicle.

13. The invention as defined by claim 12, and wherein:

said first member is adapted for being urged by a magnetic field, and said bearing comprises a first magnet adapted for providing a magnetic field for urging said first member in a first direction.

14. The invention as defined by claim 13, and wherein said first magnet comprises a first permanent magnet.

15. The invention as defined by claim 14, and wherein said first magnet comprises a first electromagnet, and including electric current control means for providing a controlled electric current to said first electromagnet, and wherein said electric current control means is adapted to control said electric current to provide amounts of said electric current that maintain said first member at a predetermined axial position.

16. The invention as defined by claim 15, and including:

a source of illuminating light, light sensing means responsive to said illuminating light by generating an illumination signal indicating the amount of said illuminating light being received by said light sensing means, and means responsive to the axial position of said first member by controlling the fraction of said illuminating light that is received by said light sensing means, and wherein said electric current control means is responsive to said illumination signal.

17. The invention as defined by claim 16, and including a second magnet comprising a second electromagnet, and wherein:

said second magnet is adapted for providing a magnetic field for urging said first member in the direction opposite said first direction, said electric current control means provides controlled electric current to said second electromagnet, and said electric current control means controls said currents to said first and second electromagnets to current levels that keep said first member at a predetermined axial position.

18. The invention as defined by claim 11, and comprising a multiplicity of said cameras each disposed for viewing said visible element for determining the velocity of a said image, and wherein the average of said velocities is computed to obtain an average velocity, whereby said average velocity is insensitive to radial movement of said first member relative to said second member.

19. The invention as defined by claim 11, and wherein:

said visible element is such that at each angular position of said first member relative to said second member said image is different from said image for all other angular positions of said first member, and said means for computing means comprises means for computing the angular position of said first member relative to said second member.

20. The invention as defined by claim 19, and including a bearing adapted for bearing said first member to rotate freely relative to said second member about an axis parallel to the roll axis of the vehicle, whereby said angular rate sensor is a roll rate and roll angle sensor for a vehicle.

21. The invention as defined by claim 19, and wherein:

said visible element comprises an array of unique objects, said means for computing the angular position of said first member relative to said second member comprises means for ascertaining which of said objects is imaged by said image and a corresponding range of angular positions of said first member, and said means for computing the angular position of said first member relative to said second member also comprises means for determining a particular angular position within said range of angular positions of said first member according to the position of said image within said array of light sensing cells.

22. The invention as defined by claim 11, and wherein:

said camera comprises a lens and a CMOS integrated circuit, said CMOS integrated circuit comprises said means for computing and said array of light sensing cells, and said lens is adapted for focusing images of said visible element on said array of light sensing cells.

23. A vehicle rollover sensor comprising:
a rotor having a rotor axis and mountable within a vehicle,
said rotor being freely rotatable about the rotor axis,
said rotor axis being fixed relative to the vehicle; and
a detector for detecting rotation of said rotor about the rotor axis,
said detector providing a detector signal indicative of rotation of said rotor relative to said detector,
whereby a vehicle rollover condition may be determined based on the detector signal.

24. A sensor as set forth in claim 23, further including a housing fixedly mounted within the vehicle,
said rotor being located within said housing with the rotor axis extending in a direction of travel of the vehicle,
inertia of said rotor resulting in relative rotation between said rotor and said housing during a vehicle rollover condition.

25. A sensor as set forth in claim 24, and wherein said detector is fixed relative to said housing for detecting relative rotation between said rotor and said housing,
said detector providing the detector signal indicative of rotation of said rotor relative to said detector.

26. A sensor as set forth in claim 23, and wherein said sensor further includes a differentiator electrically connected to said detector,
said differentiator outputting the detector signal indicative of the rate of relative rotation between said rotor and said rotor axis.

27. A sensor as set forth in claim 23, and wherein said detector is a light detector for detecting light that varies as a function of the relative orientation between said rotor and said housing about the rotor axis,
said light detector providing the detector signal.

28. A sensor mountable in a vehicle and comprising:
a rotor having a rotor axis about which it is inertially balanced and free to rotate, said rotor comprising an axle extending from said rotor concentrically with said axis,
a bearing fixed relative to said vehicle for bearing said axle, and
rotation sensing means responsive to rotation of said rotor about said rotor axis by providing a rotation signal indicating a rate of relative rotation, whereby
said rotation signal indicates the rate of rotation of said vehicle about a vehicle axis oriented parallel to said rotor axis.

29. The invention as defined by claim 28, and wherein:
said bearing comprises bearing surfaces in contact with each other, and
a said bearing surface comprises diamond-like carbon.

30. The invention as defined by claim 28, and wherein:
said rotor is adapted for being urged by a magnetic field, and
said bearing comprises a first magnet adapted for providing a first magnetic field for urging said rotor in a first direction.

31. The invention as defined by claim 30, and wherein said first magnet comprises a first permanent magnet.

32. The invention as defined by claim 30, and wherein said first magnet comprises a first electromagnet, and including
electric current control means for providing a controlled electric current to said first electromagnet, and wherein
said electric current control means is adapted to control said current to current levels that keep said rotor at a predetermined axial position.

33. The invention as defined by claim 32, and including:
a source of illuminating light,
light sensing means responsive to said illuminating light by generating an illumination signal indicating the amount of said illuminating light being received by said light sensing means, and
means responsive to the axial position of said rotor by controlling the fraction of said illuminating light that is received by said light sensing means, and wherein
said electric current control means is responsive to said illumination signal.

34. The invention as defined by claim 33, and wherein said source of illuminating light comprises a laser diode and an optically conductive fiber adapted for conducting light from said laser diode to a point on said axle of said rotor.

35. The invention as defined by claim 32, and wherein:
said bearing comprises a second magnet adapted for providing a second magnetic field for urging said rotor in the direction opposite said first direction,
said second magnet comprises a second electromagnet,
said electric current control means is adapted for providing controlled electric current to said second electromagnet, and
said electric current control means controls said electric currents to said first and second electromagnets to current levels that keep said rotor at a predetermined axial position.

36. The invention as defined by claim 35, and wherein said first electromagnet and said second electromagnet are connected in series, whereby
said first electromagnet and said second electromagnet receive the same electric current from said electric current control means.

* * * * *